UNITED STATES PATENT OFFICE.

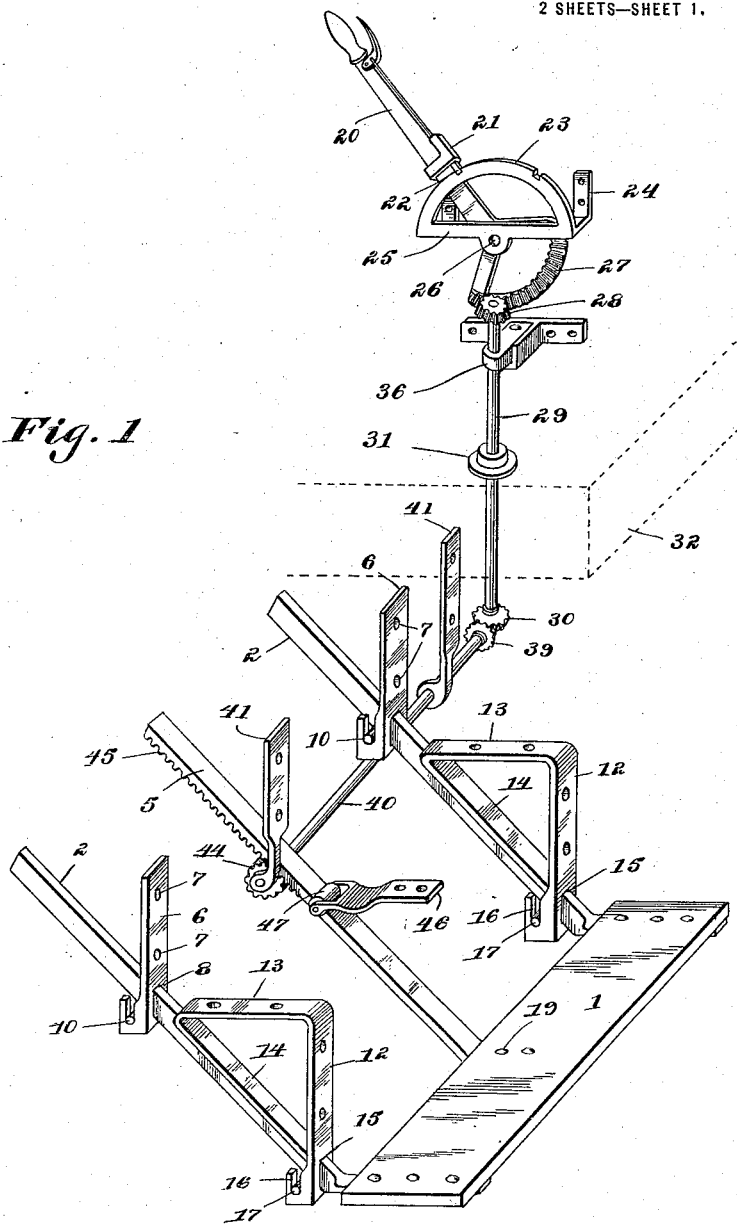

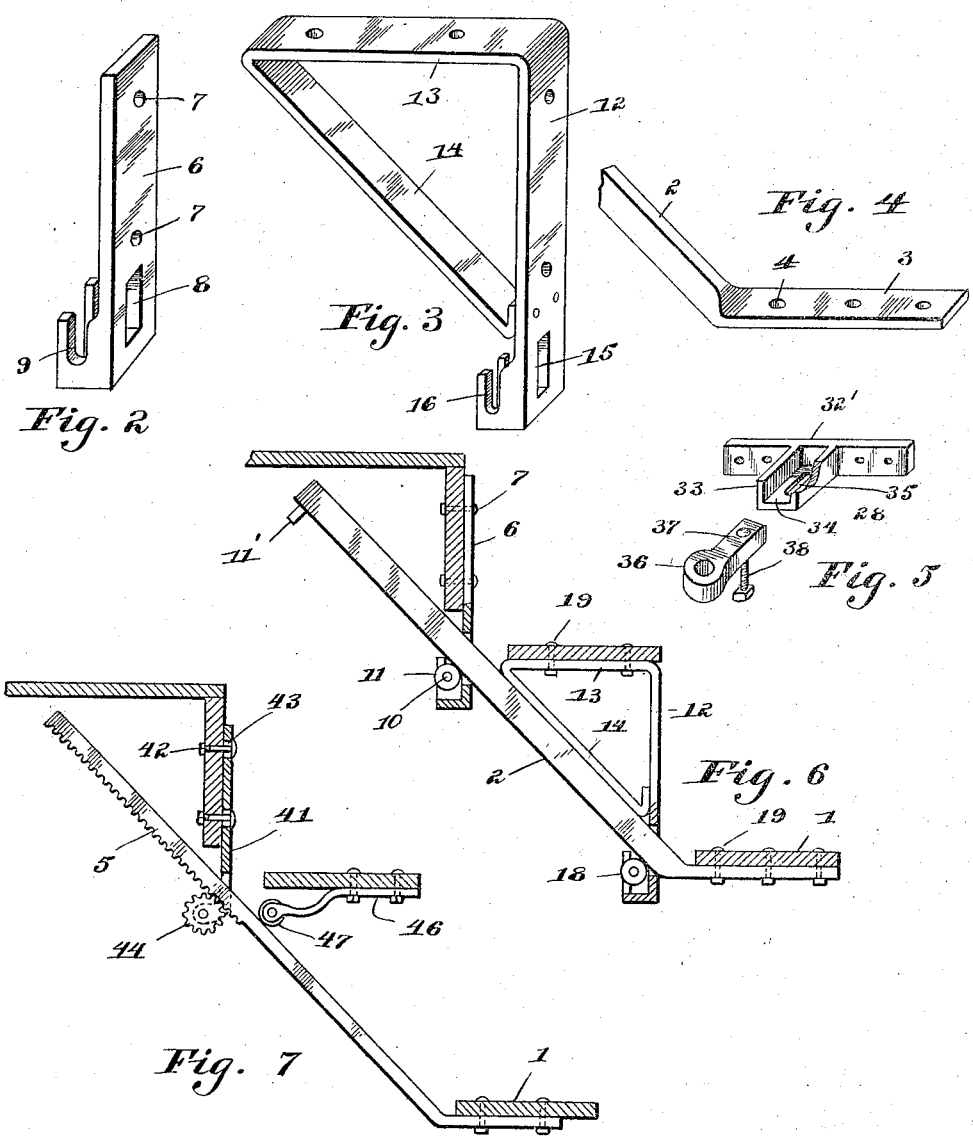

GABRIEL L. DAVIS, OF VISALIA, CALIFORNIA.

EXTENSION CAR-STEP.

1,191,770.     Specification of Letters Patent.     Patented July 18, 1916.

Application filed November 30, 1915. Serial No. 64,341.

*To all whom it may concern:*

Be it known that I, GABRIEL L. DAVIS, a citizen of the United States, residing at Visalia, in the county of Tulare and State of California, have invented new and useful Improvements in Extension Car-Steps, of which the following is a specification.

This invention relates to extension car steps, the object in view being to provide a practical and reliable extension step or tread available for use on all railway passenger cars and particularly Pullman coaches, the extension step being also available for use on street railway cars, automobiles, and, in fact, any moving vehicle wherever an extension step is found practicable and desirable.

With the above and other objects in view, the nature of which will more fully appear as the description proceeds, the invention consists in the novel construction, combination and arrangement of parts, as herein described, illustrated and claimed.

In the accompanynig drawings:—Figure 1 is a perspective view of the extension car step together with the operating means therefor, illustrating the same in the applied relation to a passenger car. Fig. 2 is a detail perspective view of one of the guiding hangers. Fig. 3 is a similar view of one of the bracing hangers. Fig. 4 is a fragmentary perspective view of one of the lower end portions of the slidable supports. Fig. 5 is a detail perspective view of the sectional and adjustable bearing bracket. Fig. 6 is a vertical section taken in line with one of the sliding supports. Fig. 7 is a vertical section taken in line with the rack and pinion mechanism.

Referring to the drawings 1 designates the tread of the extension step which is normally located under the lowermost step of a car, the tread 1 being adapted to be projected outwardly beyond the lower step of the car and at the same time lowered a suitable distance below the level of the lowest car step.

In carrying out the present invention, slidable supports 2 are fastened at their lower extremities to the tread 1 preferably on the under side thereof. The shape of one of these slidable supports is best illustrated in Fig. 4 wherein it will be observed that the main body portion of each slidable support is greater in height than in width, being disposed edgewise vertically as shown while the lower end portion thereof is flattened as indicated at 3 to extend edgewise horizontally in order that it may be provided with holes 4 to receive fasteners by means of which the tread and the slidable supports are securely fastened together.

In the preferred embodiment of this invention two of such slidable supports are employed and are connected to the tread 1 adjacent to the opposite ends thereof as clearly shown in Fig. 1. At a point between the slidable supports 2 a rack bar 5 is fastened in the same manner to the tread 1 and extends upwardly at an inclination and is parallel to and located between the slidable supports 2 which also incline upwardly, all of the members 2 and 5 having the same general inclination or slope as the stringers or frame of the car steps.

Secured to the frame or steps of the car are guiding hangers 6, the same being shown as formed with bolt holes 7 whereby they may be fastened in place by means of bolts. Each of said hangers is formed with a slot 8 in the lower end portion thereof through which the adjacent slidable support 2 passes. The lower end of each hanger 6 is also enlarged and forked to straddle the support 2 and is formed with open slots 9 which receive the end pintles or journals 10 of an anti-friction roller 11 which underlies the adjacent support 2 and enables the latter to slide easily through the slot or opening 8. At its inner extremity each of the supports 2 is provided with a stop 11' shown in the form of a pin which in the outward movement of the support 2 is adapted to come in contact with the hanger 6 thereby limiting the outward movement of the tread 1 and holding the same in its useful position.

In connection with each of the hangers 6 and each of the slidable supports 2 I also employ a bracing hanger comprising an upright riser support 12, a tread support 13 and an inclined brace proper 14, the support 2 being slidable under the brace 14 and through a slot 15 in the bottom portion of the hanger. This hanger like the hanger 6 above described is also provided with slots 16 to receive the pintles or journals 17 of a roller 18 which underlies the respective slidable support 2, the roller 18 having the same function as the roller used in conjunction with the hanger 6. The bracing hanger is secured to the steps or frame by bolts 19 or the equivalent thereof.

The means for operating the extension step, in the preferred embodiment of the invention, comprises a hand lever 20 provided with a spring thrust latch 21 which engages notches 22 in an arcuate rack 23. This rack is provided with attaching arms 24 adapting it to be fastened to the body of the car as indicated in Fig. 1. A cross bar 25 is shown as formed integrally with the arcuate rack 23 and the lever 20 is fulcrumed on said cross bar at 26. Below the fulcrum pin 26 the lever 20 carries a beveled sector gear 27 the teeth of which mesh with a pinion 28 on the upper extremity of an upright shaft 29 having fast on the lower extremity thereof a bevel gear 30. The shaft 29 passes through an opening or bearing 31 in the end sill 32 of the car frame and also through a sectional and adjustable bearing which is arranged close to the pinion 28. This bearing is illustrated in detail in Fig. 5 wherein it is shown as comprising a fixed section 32' having an outwardly projecting part 33 which is formed with a socket 34 and a slot 35 in the base or floor of the socket. The adjustable section of the bearing bracket comprises a bearing 36 in which the shaft 29 revolves and which also comprises a tang 37 which is adjustable in the socket 34 and is held in any adjusted position by means of a bolt 38 which is movable lengthwise of the slot 35. The construction just described enables the pinion 28 to be adjusted into perfect intermeshing relation to the sector gear 27.

The gear 30 at the lower extremity of the shaft 29 meshes with a pinion 39 on the adjustable end of a countershaft 40 which is journaled in shaft hangers 41 secured to the steps or the frame thereof by means of bolts 42, one of said shaft hangers being formed with slots 43 for the bolts 42 in order to provide for a slight adjustment of one end of the shaft 40 to cause a pinion 44 on the shaft 40 to properly mesh with the teeth 45 of the rack bar 5 above referred to. 46 designates a resilient roller support which is fastened to the car steps or frame which carries at the free end thereof a roller 47 which bears against the upper side of the rack bar 5 just above the pinion 44 and serves to maintain the rack and pinion elements in working relation to each other.

From the foregoing description, taken in connection with the accompanying drawings, the operation of the mechanism will now be understood.

By means of the operating lever 20, rotary motion may be imparted to the shaft 29 and thereby to the countershaft 40, causing a co-operation between the pinion 44 and the rack bar 5 and thus effecting a sliding movement of the supports 2 and a corresponding movement of the extension step or tread 1. When the lever 20 is moved in one direction, the step or tread 1 is projected from beneath the lowermost stationary step of the car and moved to the useful position shown in Fig. 1. When in such position, the parts are locked by means of the thumb latch 21. To restore the extension step to its folded or elevated position, the lever 20 is moved in the opposite direction and locked by means of the thumb latch 21. In such movement, the step 1 is carried upwardly in an inclined plane and positioned under the lowest stationary step of the car where it is entirely out of the way and concealed.

I do not desire to be limited to the arrangement herein shown and described as it will be apparent that various changes may be made in the form, proportion and minor details of construction without departing from the principle or sacrificing any of the advantages of the invention.

Having thus described my invention, I claim:—

1. In an extension car step, an extension step tread, inclined slidable supports for said tread, a plurality of guiding hangers for each of said supports, an operating lever for shifting said tread and its slidable supports, a sector gear on said lever, an upright shaft actuated by said sector gear, a countershaft extending horizontally under the step line, rack and pinion means connecting said countershaft with extension tread, and a spring tensioned roller maintaining the rack and pinion elements of the last named means in working engagement with each other.

2. In an extension car step, an extension step tread, inclined slidable supports for said tread, a plurality of guiding hangers for each of said supports, an operating lever for shifting said tread and its slidable supports, a sector gear on said lever, an upright shaft actuated by said sector gear, a countershaft extending horizontally under the step line, rack and pinion means connecting said countershaft with the extension tread, and a bearing bracket for said upright shaft embodying a fixed section and a relatively movable and adjustable section in which said shaft is journaled.

3. In an extension car step, an extension step tread, inclined slidable supports for said tread, a plurality of guiding hangers for each of said supports, an operating lever for shifting said tread and its slidable supports, a sector gear on said lever, an upright shaft actuated by said sector gear, a countershaft extending horizontally under the step line, rack and pinion means connecting said countershaft with the extension tread, and stops on the inner ends of said slidable supports which contact with certain of said hangers to limit the outward movement thereof.

4. In an extension car step, an extension step tread, inclined slidable supports for said tread, a plurality of guiding hangers for each of said supports, an operating lever for shifting said tread and its slidable supports, a sector gear on said lever, an upright shaft actuated by said sector gear, a countershaft extending horizontally under the step line, rack and pinion means connecting said countershaft with the extension tread, a spring tensioned roller maintaining the rack and pinion elements of the last named means in working engagement with each other, and means for adjusting said pinion element toward said rack element.

In testimony whereof I affix my signature in presence of two witnesses.

GABRIEL L. DAVIS.

Witnesses:
CLAUDE E. JORDAN,
DANIEL T. NICHOLSON.

Copies of this patent may be obtained for five cents each, by addressing the "Commissioner of Patents, Washington, D. C."